US012749155B2

(12) United States Patent
Son et al.

(10) Patent No.: US 12,749,155 B2
(45) Date of Patent: Sep. 29, 2026

(54) RENDERING METHOD AND DEVICE AND TRAINING METHOD FOR RENDERING

(71) Applicant: SAMSUNG ELECTRONICS CO., LTD., Suwon-si (KR)

(72) Inventors: Minjung Son, Suwon-si (KR); Nahyup Kang, Suwon-si (KR); Jaeyoung Moon, Suwon-si (KR); Sungheon Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 138 days.

(21) Appl. No.: 18/776,955

(22) Filed: Jul. 18, 2024

(65) Prior Publication Data

US 2025/0238899 A1 Jul. 24, 2025

(30) Foreign Application Priority Data

Jan. 18, 2024 (KR) ........................ 10-2024-0008257

(51) Int. Cl.
*G06T 5/50* (2006.01)
*G06T 7/50* (2017.01)
(Continued)

(52) U.S. Cl.
CPC .................. *G06T 5/50* (2013.01); *G06T 7/50* (2017.01); *G06T 7/60* (2013.01); *G06T 11/00* (2013.01);
(Continued)

(58) Field of Classification Search
CPC .... G06T 5/50; G06T 7/50; G06T 7/60; G06T 11/00; G06T 2207/20084;
(Continued)

(56) References Cited

U.S. PATENT DOCUMENTS 11,259,390 B2 2/2022 Kamp et al.
12,586,303 B2 * 3/2026 Xu .......................... G06T 11/00
(Continued)

FOREIGN PATENT DOCUMENTS

JP 2023-93312 A 7/2023
KR 10-2020-0019395 A 2/2020

OTHER PUBLICATIONS

Granskog et al., Compositional neural scene representations for shading inference, ACM Trans. Graph., vol. 39, No. 4, Article 135, Jul. 2020 (Year: 2020).*

(Continued)

*Primary Examiner* — Devona E Faulk
*Assistant Examiner* — Donna J. Ricks
(74) *Attorney, Agent, or Firm* — Sughrue Mion, PLLC

(57) ABSTRACT

A rendering method and device are provided. The rendering method includes receiving a scene representation and a camera view, deconstructing latent code by separating static code corresponding to a static factor and dynamic code corresponding to a dynamic factor in the scene information, generating a first rendered image by inputting the static code and the camera view into a generative model based on an artificial neural network, generating a second rendered image by inputting the dynamic code, the static code, and the camera view into the generative model, and generating an output image by composing the first rendered image and the second rendered image.

21 Claims, 9 Drawing Sheets

(51) Int. Cl.
*G06T 7/60* (2017.01)
*G06T 11/00* (2026.01)

(52) U.S. Cl.
CPC ............... *G06T 2207/20084* (2013.01); *G06T 2207/20221* (2013.01)

(58) Field of Classification Search
CPC ......... G06T 2207/20221; G06T 15/005; G06T 15/10; G06T 17/00; G06T 2207/20081; G06N 3/044; G06N 3/045; G06N 3/0455; G06N 3/047; G06N 3/0475; G06N 3/08; G06N 3/084; G06N 3/088; G06N 3/09; G06V 20/00
See application file for complete search history.

(56) References Cited

U.S. PATENT DOCUMENTS

| | | | | |
|---|---|---|---|---|
| 2021/0233300 | A1 | 7/2021 | Borer et al. | |
| 2023/0058512 | A1 | 2/2023 | Frey et al. | |
| 2023/0196651 | A1 | 6/2023 | Son et al. | |
| 2024/0371081 | A1* | 11/2024 | Matthews | G06T 15/20 |

OTHER PUBLICATIONS

Sugio et al. WO 2025/105337 A1 (Year: 2025).*
S. M. Ali Eslami et al., “Neural scene representation and rendering”, Science, vol. 360, No. 6394, Jun. 15, 2018, pp. 1204-1210, DOI: 10.1126/science.aar6170.
Stavros Diolatzis et al., “Active Exploration for Neural Global Illumination of Variable Scenes”, ACM Transactions on Graphics, vol. 41, No. 5, Article No. 171, Mar. 2022, 18 pages, DOI: 10.1145/3522735.
Jonathan Granskog et al., “Compositional neural scene representations for shading inference”, ACM Transactions on Graphics, vol. 39, No. 4, Article No. 135, Jul. 2020, 13 pages, DOI: 10.1145/3386569.3392475.
Ben Mildenhall et al., “NeRF: representing scenes as neural radiance fields for view synthesis”, Communications of the ACM, vol. 65, No. 1, Jan. 2022, pp. 99-106, DOI: 10.1145/3503250.

* cited by examiner

RENDERING METHOD AND DEVICE AND TRAINING METHOD FOR RENDERING

CROSS-REFERENCE TO RELATED APPLICATION

This application is based on and claims priority to Korean Patent Application No. 10-2024-0008257, filed on Jan. 18, 2024, in the Korean Intellectual Property Office, the disclosure of which is incorporated by reference herein in its entirety.

BACKGROUND

1. Field

The disclosure relates to a rendering method and a device and a training method for rendering.

2. Description of Related Art

Three-dimensional (3D) rendering is a field of computer graphics involving the rendering of a 3D scene into a 2D image. 3D rendering may be used in various application fields, such as a 3D game, virtual reality, an animation, a movie, and the like. Neural rendering may convert a 3D scene into a 2D output image using a neural network. For example, after being trained based on deep learning, the neural network may perform purpose-specific inference by mapping, to each other, input data and output data in a nonlinear relationship. The trained ability to generate such a mapping may be referred to as a learning ability of the neural network. The neural network may observe a real scene and learn how to model and render the observed scene.

SUMMARY

According to an aspect of the disclosure, a rendering method includes: receiving a scene representation and a camera view; deconstructing latent code by separating static code corresponding to a static factor of the scene representation and dynamic code corresponding to a dynamic factor of the scene representation; generating a first rendered image by inputting the static code and the camera view into a generative model based on an artificial neural network; generating a second rendered image by inputting the static code, the dynamic code, and the camera view into the generative model; and generating an output image by composing the first rendered image and the second rendered image.

The deconstructing the latent code may include: receiving scene information including the static factor and the dynamic factor; and separating the static code and the dynamic code by separately encoding the static factor and the dynamic factor.

The scene information may include at least one of three-dimensional (3D) geometric information including a position, a normal, and a depth map, material information including a light reflection direction, and lighting information including an environment map.

The generative model may include a first neural renderer, and the generating the first rendered image may include generating, based on the static code, the first rendered image in the camera view using the first neural renderer.

The generating the first rendered image may include generating, based on the static code and static scene information extracted from the scene information, the first rendered image in the camera view by a first neural renderer.

The generative model may include a second neural renderer, and the generating of the second rendered image may include generating, based on the static code and the dynamic code, the second rendered image in the camera view by the second neural renderer.

The generating the second rendered image may include generating, based on the static code, the dynamic code, and dynamic scene information extracted from the scene information, the second rendered image in the camera view by the second neural renderer.

The generative model may include at least one of a first neural renderer configured to generate the first rendered image and a second neural renderer configured to generate the second rendered image, and the first neural renderer and the second neural renderer may be a same generative model with a same input form or different generative models with different input forms.

The generating the output image may include: generating a composite image by composing the first rendered image and the second rendered image; and generating the output image based on the composite image.

Based on the scene representation corresponding to a static scene, a value of the static code at a position in the static code may be the same as a value of the dynamic code at a position in the dynamic code corresponding to the position in the static code.

The rendering method may further include: receiving scene information corresponding to the camera view, wherein the scene information includes at least one of a geometry (G)-buffer and a rasterized image.

The generating the first rendered image may include generating, by the generative model, the first rendered image in the camera view based on information corresponding to a static factor of the scene information corresponding to the static code and the camera view.

The generating the second rendered image may include generating, by the generative model, the second rendered image in the camera view based on information corresponding to a dynamic factor of the scene information corresponding to the static code, the dynamic code, and the camera view.

According to an aspect of the disclosure, a training method for rendering includes: deconstructing first latent code by separating first static code corresponding to a first static factor and first dynamic code corresponding to a first dynamic factor; generating a (1-1)-th rendered image by inputting the first static code and a camera view into a generative model; generating a (1-2)-th rendered image by inputting the first static code, the first dynamic code, and the camera view into the generative model; generating a first output image by composing the (1-1)-th rendered image and the (1-2)-th rendered image; and training the generative model based on the first output image.

The training the generative model may include training the generative model based on a first difference between the first output image and a ground truth image corresponding to the first output image.

The training the generative model may include training the generative model based on a second difference between the first output image and a prestored first rendered image, wherein the second difference is discriminated by a first discriminator configured to discriminate between the first output image and the prestored first rendered image.

The training method may further include: training the first discriminator to distinguish between the first output image and the prestored first rendered image based on an output of the first discriminator.

The training method may further include: receiving a photographic image without a label; deconstructing, by an image encoder, second latent code including second static code corresponding to a second static factor of the photographic image and second dynamic code corresponding to a second dynamic factor of the photographic image; generating a (2-1)-th rendered image by inputting the second static code and the camera view into the generative model; generating a (2-2)-th rendered image by inputting the second dynamic code, the second static code, and the camera view into the generative model; generating a second output image by composing the (2-1)-th rendered image and the (2-2)-th rendered image; and training the generative model based on a third difference between the second output image and the photographic image.

The training of the generative model may include training the generative model based on a fourth difference between the second output image and a prestored second rendered image, wherein the fourth difference is discriminated by a second discriminator configured to discriminate between the second output image and the prestored second rendered image.

The training of the generative model may further include training the image encoder based on a fifth difference between third latent code and the first latent code, wherein the third latent code is generated by inputting the second output image into the image encoder.

According to an aspect of the disclosure, a rendering device includes: a communication interface configured to receive a scene representation and a camera view; at least one memory storing one or more instructions and a generative model based on a pretrained artificial neural network; and at least one processor in communication with the communication interface and the at least one memory, wherein the at least one processor is configured to execute the one or more instructions, and wherein the one or more instructions, when executed by the at least one processor, cause the rendering device to: deconstruct latent code by separating static code corresponding to a static factor of the scene representation and dynamic code corresponding to a dynamic factor of the scene representation, generate a first rendered image by inputting the static code and the camera view into the generative model, generate a second rendered image by inputting the dynamic code, the static code, and the camera view into the generative model, and generate a first output image by composing the first rendered image and the second rendered image.

According to an aspect of the disclosure, a non-transitory computer readable medium having instructions stored therein, which when executed by at least one processor cause the at least one processor to execute a rendering method including: receiving a scene representation and a camera view; deconstructing latent code by separating static code corresponding to a static factor of the scene representation and dynamic code corresponding to a dynamic factor of the scene representation; generating a first rendered image by inputting the static code and the camera view into a generative model based on an artificial neural network; generating a second rendered image by inputting the static code, the dynamic code, and the camera view into the generative model; and generating an output image by composing the first rendered image and the second rendered image.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1A:
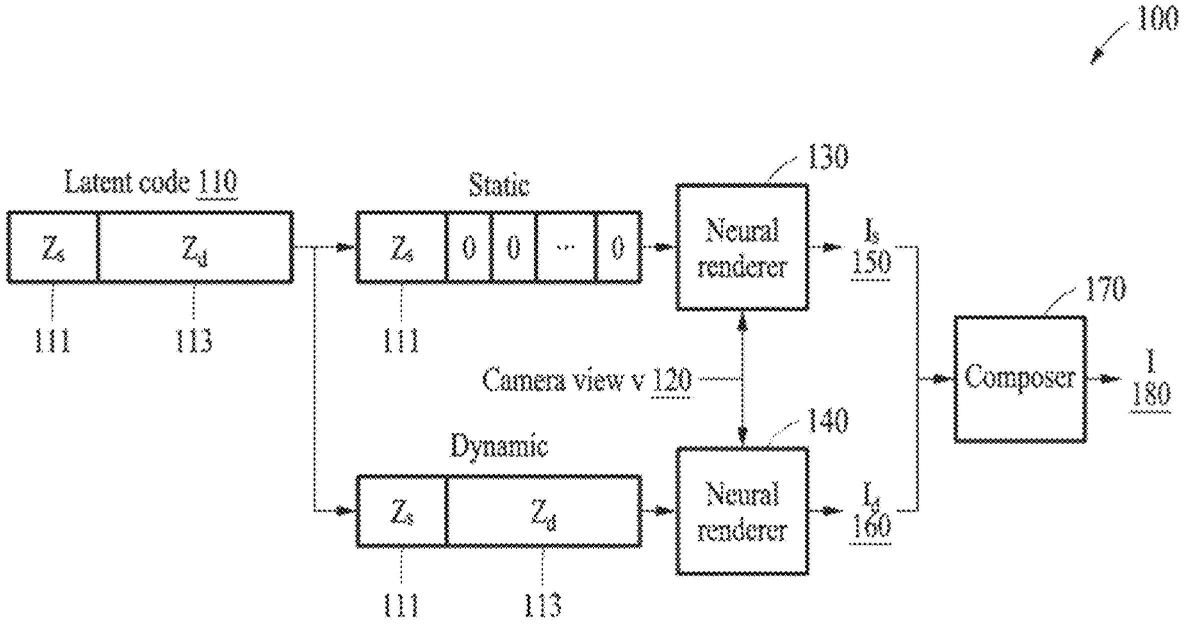
FIGS. 1A and 1B are diagrams illustrating a structure of a generative model of a rendering device, according to an embodiment.

The following detailed structural or functional description is provided as an example only and various alterations and modifications may be made to embodiments. Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, and similarly the second component may also be referred to as the first component.

It should be noted that if one component is described as being "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, should be construed to have meanings matching with contextual meanings in the relevant art, and are not to be construed to have an ideal or excessively formal meaning unless otherwise defined herein.

As used herein, the expressions "at least one of a, b or c" and "at least one of a, b and c" indicate "only a," "only b," "only c," "both a and b," "both a and c," "both b and c," and "all of a, b, and c."

Embodiments to be described below may be applied, for example, to a neural network, a processor, a smartphone, and a mobile device that are to perform photorealistic rendering.

Hereinafter, embodiments will be described in detail with reference to the accompanying drawings. When describing the embodiments with reference to the accompanying drawings, like reference numerals refer to like elements and a repeated description related thereto will be omitted.

Figure 1B:
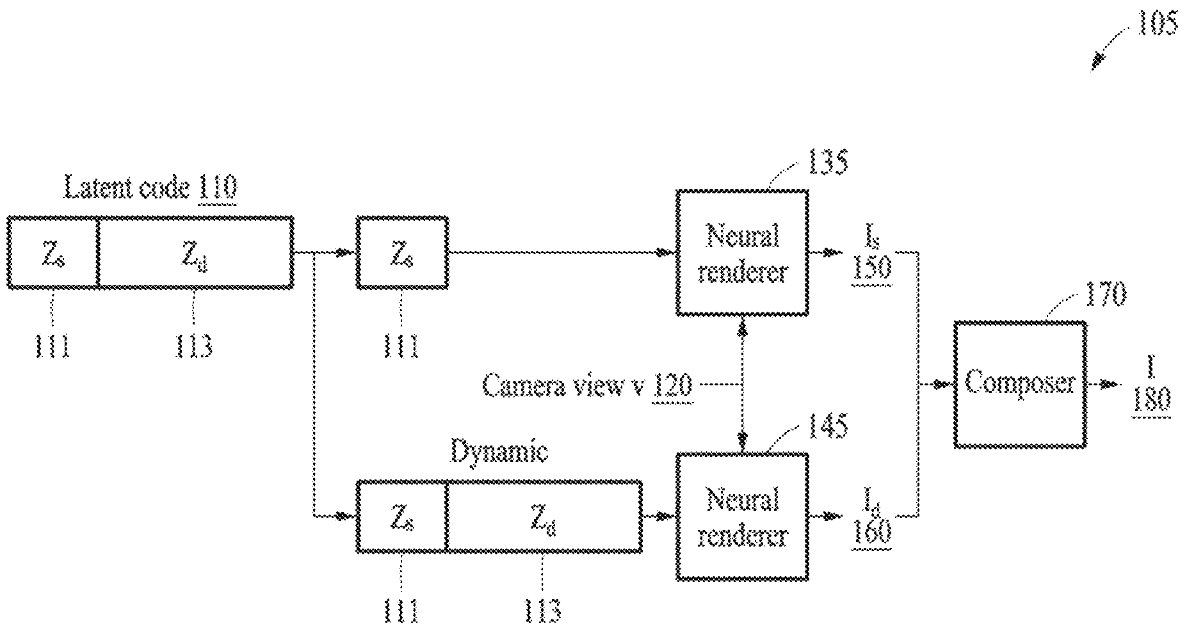

FIGS. 1A and 1B are diagrams illustrating a structure of a generative model of a rendering device, according to an embodiment. FIG. 1A illustrates a diagram 100 showing a process in which the rendering device generates an output image I 180 to which photorealistic rendering is applied through neural rendering.

The rendering device may train neural renderers (e.g., a first neural renderer 130 and a second neural renderer 140) that produce photorealistic effects with a small number of operations. In this case, the rendering device may increase coverage of various dynamic factors by constructing a representation of a scene using a compositional generative model. In addition, the rendering device may use an actual photographic image during training such that training with a relatively small number of rendered databases (DBs) is possible.

The rendering device may generate rendered images (e.g., a first rendered image $I_S$ 150 and a second rendered image $I_D$ 160) by inputting latent code 110, which is deconstructed by separating static factors and dynamic factors, and a camera view V 120, into a generative model (e.g., the neural renderers (e.g., 130 and 140)).

The generative model may include at least one of the first neural renderer 130 that generates the first rendered image $I_S$ 150 and the second neural renderer 140 that generates the second rendered image $I_D$ 160. In this case, the first neural renderer 130 and the second neural renderer 140 may be the same generative model with the same input form, as illustrated in FIG. 1A, or may be different generative models with different input forms, as illustrated in FIG. 1B.

The rendering device may generate the output image I 180 by composing 170 the rendered images (e.g., 150 and 160).

For example, when representing the latent code 110 corresponding to a scene representation as Z, the rendering device may be configured to represent some predefined channels as static code $Z_s$ 111 corresponding to a static factor of a scene and represent the other channels as dynamic code $Z_d$ 113 corresponding to a dynamic factor. In other words, the rendering device may set a scene representation corresponding to the basis for a predetermined scene as the static code $Z_s$ 111 and intensively learn all the basic information about the scene.

The dynamic code $Z_d$ 113 may correspond to a value that changes according to various dynamic factors in each scene. A dynamic factor may include, for example, moving objects such as a pedestrian, a bicycle, and a car. However, the disclosure is not limited thereto. When a dynamic factor changes in a static scene corresponding to a basis, the dynamic code $Z_d$ 113 may allow a neural renderer (e.g., 140) to change and reflect the changed dynamic factor.

The number of objects corresponding to each of the static code $Z_s$ 111 and the dynamic code $Z_d$ 113 is not necessarily limited to one. For example, there may be static code corresponding to one static object and pieces of dynamic code corresponding to N−1 dynamic objects.

Figure 3:
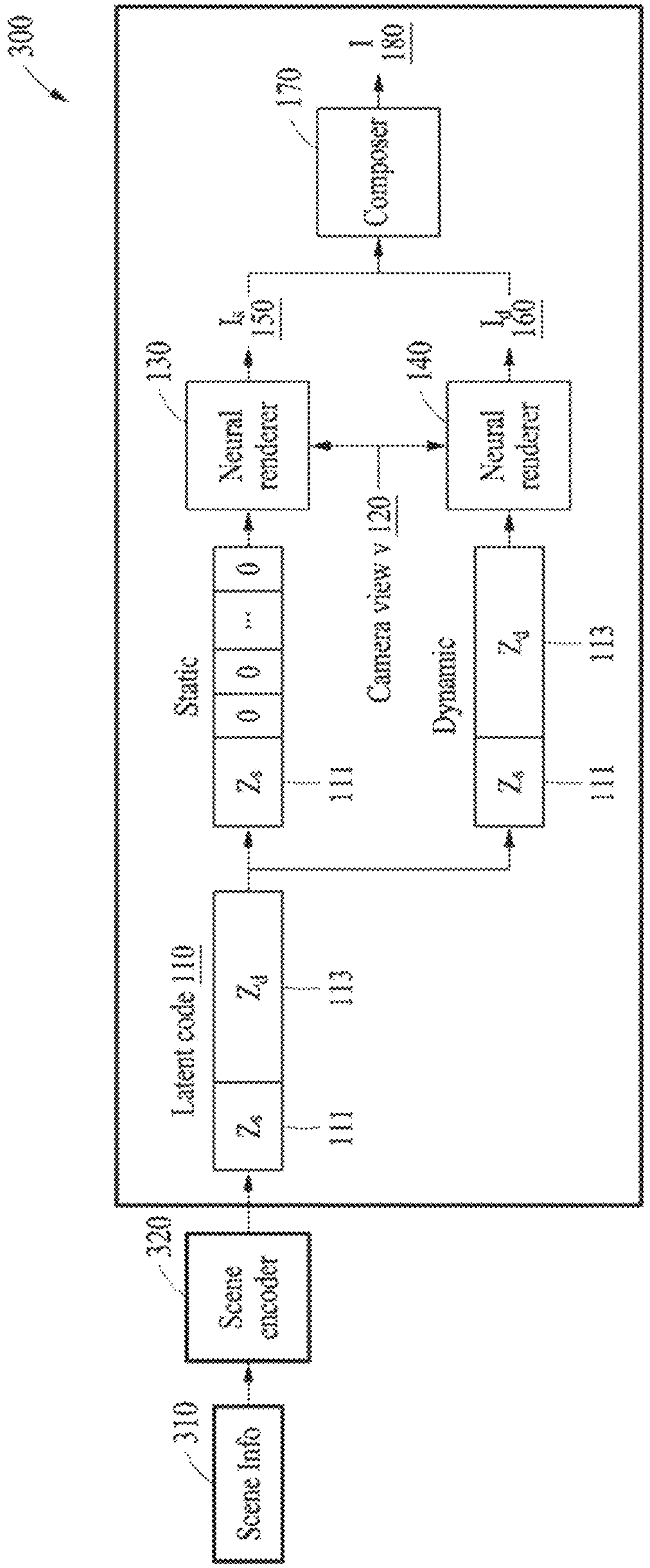
FIG. 3 is a diagram illustrating a structure and an operation of a rendering device, according to an embodiment.
Figure 4:
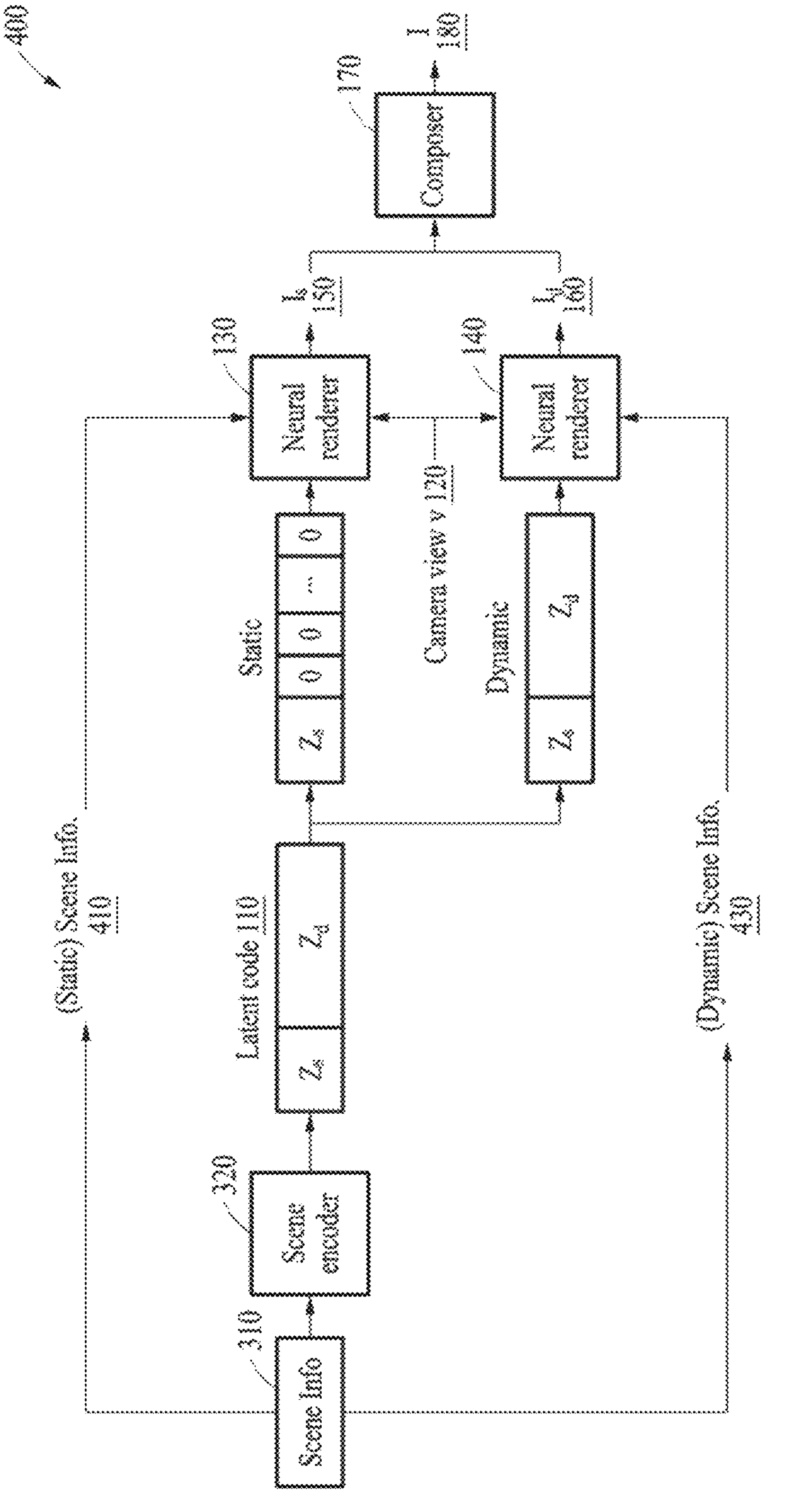
FIG. 4 is a diagram illustrating a structure and an operation of a rendering device, according to an embodiment.

The rendering device may independently construct the dynamic code $Z_d$ 113 with high dimensionality and learn a compositional structure to reflect factors (e.g. dynamic factors) changed based on a static scene, even when the final output image (e.g., 180) is generated, thereby relatively reducing the dynamic code $Z_d$ 113 and a role the neural renderer (e.g., 140) has to play for the dynamic code $Z_d$ 113. In this case, the latent code 110 may use a predefined value or may be encoded and extracted from information about an input image and a scene, as shown in FIGS. 3 and 4 below. The latent code 110 may correspond to a vector in a reduced-dimensional latent space that may effectively describe data. The latent code 110 may also be referred to as a "latent vector", a "noise vector", or "random code".

The neural renderers (e.g., 130 and 140) may generate an image in a predetermined camera view 120 based on the latent code 110 for a scene. The neural renderers (e.g., 130 and 140) may perform additional processing on the latent code 110 corresponding to a scene representation.

The first neural renderer 130 may receive the static code $Z_s$ 111 and the camera view 120 and generate the first rendered image $I_S$ 150 corresponding to a static factor. The rendering device may generate the first rendered image $I_S$ 150 in the camera view 120 using the first neural renderer 130 based on the static code $Z_s$ 111. The static code $Z_s$ 111 input into the first neural renderer 130 may be a zero vector having a portion corresponding to the dynamic code $Z_d$ 113 filled with zeros ("0"). However, the disclosure is not limited thereto. Any random value or a value learned through training may be used for a portion corresponding to the zero vector. For example, when based on the same static scene, the values of latent code at a position corresponding to the dynamic code $Z_d$ 113 may be identical to each other and set to "0".

When the first neural renderer 130 and the second neural renderer 140 use the same generative model, their input formats may have to be the same. Therefore, the rendering device may ensure uniformity in the input format of a latent vector by, for example, filling the latter portion (e.g., a portion corresponding to the dynamic code $Z_d$ 113) of the static code $Z_s$ 111 with a zero vector.

In addition, the second neural renderer 140 may generate the second rendered image $I_d$ 160 corresponding to a dynamic factor by receiving the static code $Z_s$ 111, the dynamic code $Z_d$ 113, and the camera view 120. The rendering device may use the second neural renderer 140 based on the static code $Z_s$ 111 and the dynamic code $Z_d$ 113 to generate the second rendered image $I_d$ 160 in the camera view 120.

When a ground truth (GT) image is generated using classic rendering, it may be possible to separate static factors and dynamic factors to generate GT images corresponding to the static factors and the dynamic factors (e.g., a GT image corresponding to the static factors and a GT image corresponding to the dynamic factors). Each of the GT images may be used to obtain losses of the first rendered image $I_S$ 150 and the second rendered image $I_D$ 160. In this case, a composer 170 may perform a predefined operation, not based on learning, to separate a static image and a dynamic image contrasting with the final result image.

In an embodiment, training may be performed on the entire rendering device by obtaining a loss of the final image generated through the composer 170 instead of obtaining a loss of each of the first rendered image 150 and the second rendered image 160.

The neural renderers (e.g., 130 and 140) may be the same generative model with the same input form or may be different generative models with different input forms, as shown in FIG. 1B below.

In this case, the neural renderers (e.g., 130 and 140) may be configured as separate renderers for the static code $Z_s$ 111 and the dynamic code $Z_d$ 113, respectively, or as a single shared neural renderer. According to an embodiment, the rendering device may generate rendered images by volume rendering instead of using a neural renderer based on a neural network.

The composer 170 may generate a composite image by composing (i.e., combining) the first rendered image $I_S$ 150 and the second rendered image $I_d$ 160. The composer 170 may generate the output image I 180 based on the composite image. In this case, the second rendered image $I_d$ 160 may effectively reflect a change in brightness due to a dynamic factor (e.g., a portion with + brightness becomes brighter and a portion with − brightness becomes darker). However, in a case in which a dynamic factor, such as a geometric change resulting from the movement of an object, has a relatively significant impact on the output image I 180, the composer 170 may include a learnable network to reflect the dynamic factor more efficiently.

For example, the composer 170 may generate the output image I 180 by normalizing the composite image, performing another operation on the composite image, or generating the output image I 180 by inputting the composite image into neural networks. Accordingly, the composer 170 may also generate the output image I 180 by processing the composite image in various manners.

FIG. 1B illustrates a diagram 105 showing a process in which the rendering device generates the output image I 180 to which photorealistic rendering is applied through neural rendering.

The rendering device may train neural renderers (e.g., a first neural renderer 135 and a second neural renderer 145) that produce photorealistic effects with a small number of operations. In this case, the rendering device may increase coverage of various dynamic factors by constructing a representation of a scene using a compositional generative model. In addition, the rendering device may use an actual photographic image during training such that training with a relatively small number of rendered DBs is possible.

The first neural renderer 135 and the second neural renderer 145 may correspond to different generative models. The first neural renderer 135 may correspond to a generative model suitable for a static factor. The second neural renderer 145 may correspond to a generative model suitable for a dynamic factor.

The rendering device may generate rendered images (e.g., the first rendered image $I_S$ 150 and the second rendered image $I_D$ 160) by inputting the latent code 110, which is deconstructed by separating static factors and dynamic factors, and the camera view V 120 into a generative model (e.g., the neural renderers (e.g., 135 and 145)). The rendering device may generate the output image I 180 by composing 170 the rendered images (e.g., 150 and 160).

The first neural renderer 135 and the second neural renderer 145 may use different generative models. In this case, the input formats of the first neural renderer 135 and the second neural renderer 145 do not need to be the same. Therefore, the rendering device may input the static code $Z_s$ 111 directly into the first neural renderer 135 by not filling the latter portion (a part corresponding to the dynamic code $Z_d$ 113) of the static code $Z_s$ 111.

In addition, the first neural renderer 135 and the second neural renderer 145 may be configured separately, as shown in FIG. 1B, or as a single generative model. When the first neural renderer 135 and the second neural renderer 145 are configured as a single generative model, the rendering device may sequentially input and process the static code $Z_s$ 111 and the dynamic code $Z_d$ 113 separately and then integrate the static code $Z_s$ 111 and the dynamic code $Z_d$ 113 into one or may process the static code $Z_s$ 111 and the dynamic code $Z_d$ 113 in parallel.

Figure 2:
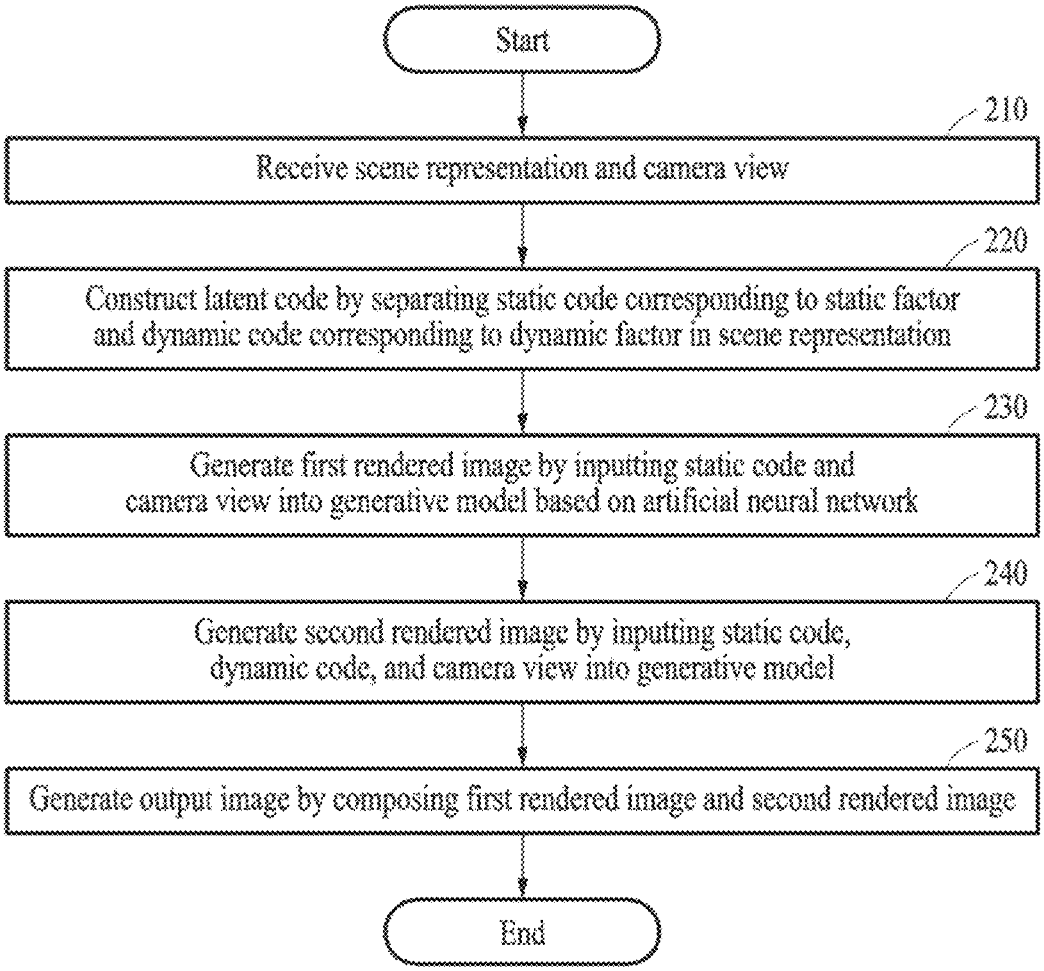
FIG. 2 is a flowchart illustrating a rendering method according to an embodiment.

FIG. 2 is a flowchart illustrating a rendering method according to an embodiment. Operations to be described with reference to FIG. 2 and below may be performed sequentially but not necessarily. For example, the order of the operations may change and at least two of the operations may be performed in parallel, or one operation may be performed separately.

Referring to FIG. 2, a rendering device may generate an output image through operations 210 to 250.

In operation 210, the rendering device may receive a scene representation and a camera view. The camera view may include the position and angle of a camera corresponding to a scene of a three-dimensional (3D) model. The camera view may be sampled differently to fit various situations. The rendering device may sample the camera view by randomly selecting a camera pose and a camera direction in the 3D model. An electronic device may sample the camera view using a camera pose and a camera direction that are randomly determined based on a predetermined distribution corresponding to the 3D model.

In operation 220, the rendering device may deconstruct latent code by separating static code corresponding to a static factor and dynamic code corresponding to a dynamic factor in the scene representation received in operation 210. The rendering device may receive scene information. The scene information may include, for example, at least one of 3D geometric information including a position, a normal, and a depth map, material information including a light reflection direction, and lighting information including an environment map. However, the disclosure is not limited thereto. The material information may be, for example, a bidirectional reflectance distribution function (BRDF). However, the disclosure is not limited thereto. The environment map is one way of representing lighting information for a scene and may be one in which an environment surrounding a scene is stored as a map or image. When the environment map is used, values may be sampled in a corresponding direction for use in a lighting operation.

The rendering device may separate static code and dynamic code by separately encoding a static factor and a dynamic factor included in the scene information. For example, when the scene representation corresponds to a static scene, the values of the latent code at a position corresponding to the dynamic code in the static code may be the same as the dynamic code.

In operation 230, the rendering device may generate a first rendered image by inputting the static code and the camera view received in operation 210 into a generative model based on an artificial neural network. The generative model may include a first neural renderer. In this case, the rendering device may generate, based on the static code, the first rendered image in the camera view using the first neural renderer. In addition, the rendering device may generate, based on the static code and static scene information extracted from the scene information, the first rendered image in the camera view using the first neural renderer. The first neural renderer may generate (render) a 2D image corresponding to the 3D model according to the camera view.

According to an embodiment, the rendering device may further receive scene information corresponding to the camera view. The scene information corresponding to the camera view may include at least one of a geometry (G)-buffer and a rasterized image. The G-buffer may correspond to a texture that stores every information in a scene. The G-buffer may process the scene in two passes. The first pass may be referred to as a "geometry pass". On the geometry pass, the rendering device may draw all objects in the scene all at once and store the information contained in the objects in the G-buffer. The information contained in the objects may include, for example, a position vector, a color vector, a surface vector, and/or a reflection value. The second pass may be referred to as a "lighting pass". On the lighting pass, the rendering device may calculate the lighting of the scene using the information stored in the G-buffer. The rendering device may calculate lighting by repeatedly traversing the G-buffer for each pixel. The G-buffer may include various types of textures, such as a diffuse color texture, a normal texture, and a depth texture. The diffuse color texture may represent the general color of the scene. The normal texture may represent an image texture mapped to the surface of the scene. The depth texture may represent the depth of the scene. The textures described above may be used to calculate lighting using a technique called "deferred shading". A rasterized image may be one that is obtained by converting vector graphics that generate a shape in computer graphics (CG) into a corresponding pixel pattern image. The rasterized image may be stored or manipulated in bitmap form.

The rendering device may generate a first rendered image in the camera view using the generative model, based on information corresponding to a static factor of scene information corresponding to the static code and the camera view.

In operation 240, the rendering device may generate a second rendered image by inputting the static code, the dynamic code, and the camera view into the generative model. The generative model may include a second neural renderer. In this case, the rendering device may generate, based on the static code and the dynamic code, the second rendered image in the camera view using the second neural renderer. The rendering device may generate, based on the static code, the dynamic code, and dynamic scene information extracted from the scene information, the second rendered image in the camera view using the second neural renderer. Alternatively, the rendering device may generate, based on information corresponding to a dynamic factor of the scene information corresponding to the static code, the dynamic code, and the camera view, the second rendered image using the generative model.

In operation 250, the rendering device may generate the output image by composing the first rendered image generated in operation 230 and the second rendered image generated in operation 240. The rendering device may generate a composite image obtained by composing the first rendered image and the second rendered image. The rendering device may generate the output image based on the composite image.

FIG. 3 is a diagram illustrating a structure and an operation of a rendering device, according to an embodiment. FIG. 3 illustrates a diagram 300 showing an embodiment in which the rendering device encodes and utilizes the latent code 110 from scene information 310 of an input scene.

The rendering device may receive the scene information 310. The rendering device may separate the static code 111 and the dynamic code 113 by separately encoding a static factor and a dynamic factor included in the scene information 310, using a scene encoder 320.

The rendering device may encode the input scene information 310 and extract the latent code 110 corresponding to a scene representation. The scene information 310 may include at least one of 3D geometric information including a position, a normal, and a depth map, material information including a light reflection direction, and lighting information including an environment map.

As described in more detail below, the rendering device may separate information ("static factor") about the entire scene and information ("dynamic factor") about a change in a rendering result due to a dynamic object and the like to train each neural renderer, thereby ensuring efficient training. Each trained neural renderer may generate a photorealistic image according to the latent code 110 corresponding to the scene representation. A neural renderer may generate a photorealistic image by performing a relatively small number of operations on the information about a change in a rendering result.

FIG. 4 is a diagram illustrating a structure and an operation of a rendering device, according to an embodiment. FIG. 4 illustrates a diagram 400 showing a process of generating the output image 180 by additionally utilizing scene information (e.g., 410 and 430) in a predetermined camera view.

The rendering device may help improve the quality of neural renderers (e.g., 130 and 140) by transmitting additional scene information (e.g., 410 and 430) other than the latent code 110 representing the entire scene. The scene information (e.g., 410 and 430) may correspond to local scene information corresponding to the camera view 120.

The rendering device may transmit, to the neural renderers 130 and 140, the scene information (e.g., 410 and 430) corresponding to the camera view 120 to be rendered. The scene information (e.g., 410 and 430) corresponding to the camera view 120 may include, for example, a G-buffer and a rasterized image. However, embodiments are not limited thereto.

Like the latent code 110, the rendering device may transmit the scene information corresponding to the camera view 120 by separating a static factor and a dynamic factor, thereby providing additional information to each renderer without any confusion.

The rendering device may generate the first rendered image 150 in the camera view 120 using a generative model (e.g., the first neural renderer 130), based on the static code $Z_s$ and scene information (e.g., 410) corresponding to a static factor of the scene information corresponding to the camera view 120.

In addition, the rendering device may generate the second rendered image 160 in the camera view 120 using a generative model (e.g., the second neural renderer 140), based on the static code $Z_s$, the dynamic code $Z_d$, and scene information (e.g., 430) corresponding to a dynamic factor of the scene information corresponding to the camera view 120.

Figure 5:
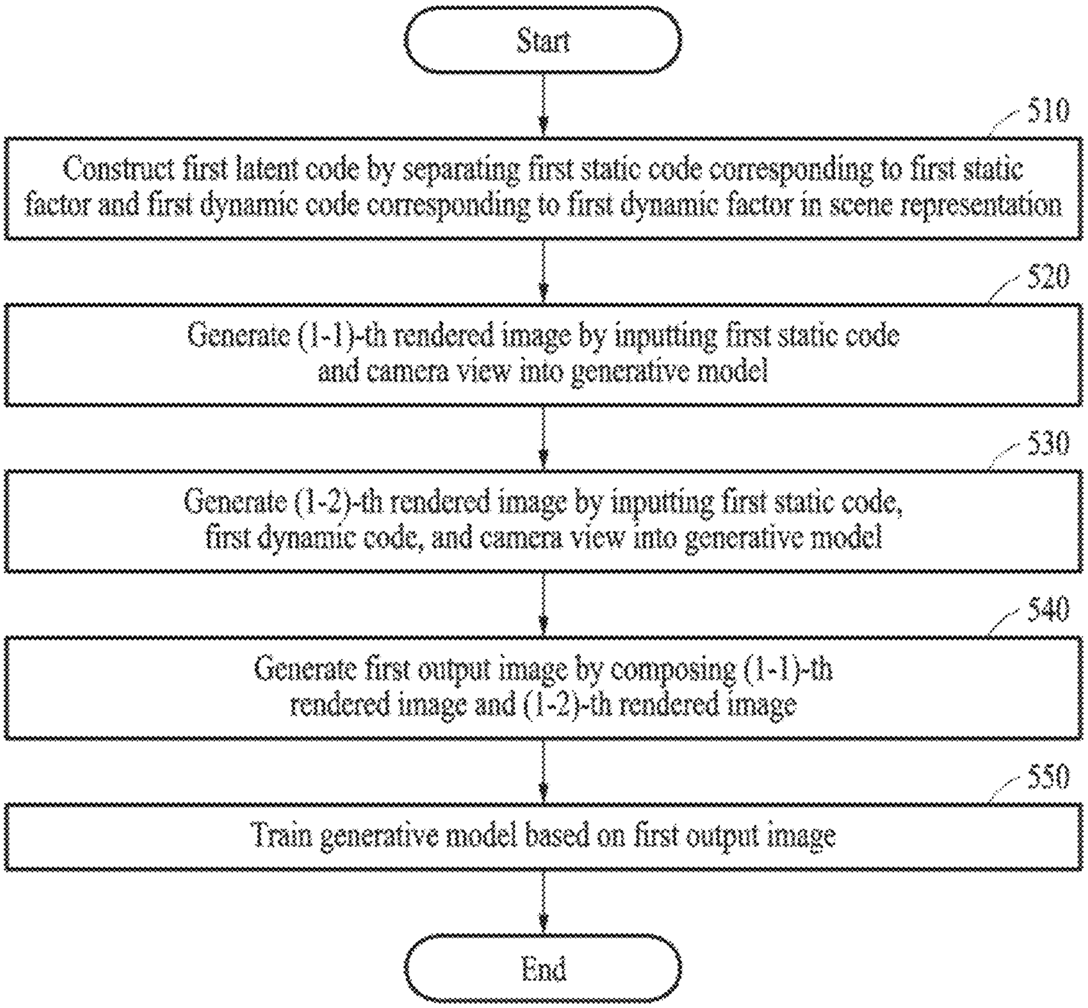
FIG. 5 is a flowchart illustrating a training method for rendering, according to an embodiment.

FIG. 5 is a flowchart illustrating a training method for rendering, according to an embodiment. Referring to FIG. 5, a training device may train a generative model through operations 510 to 550.

In operation 510, the training device may deconstruct first latent code by separating first static code corresponding to a first static factor and first dynamic code corresponding to a first dynamic factor in a scene representation.

In operation 520, the training device may generate a (1-1)-th rendered image by inputting the first static code and a camera view into a generative model.

In operation 530, the training device may generate a (1-2)-th rendered image by inputting the first static code, the first dynamic code, and the camera view into the generative model.

In operation 540, the training device may generate a first output image by composing the (1-1)-th rendered image and the (1-2)-th rendered image.

In operation 550, the training device may train the generative model based on the first output image generated in operation 540. The training device may train the generative model based on a first difference between the first output image and a GT image corresponding to the first output image. Here, the first difference between the first output image and the GT image corresponding to the first output image may be referred to as a "reconstruction loss".

According to an embodiment, the training device may further include a first discriminator that discriminates between the first output image and the first rendered image corresponding to the first output image. In this case, the training device may train the generative model based on a second difference, which is discriminated by the first discriminator, between the first output image and the first rendered image. Here, the second difference between the first output image and the first rendered image may be referred to as a "generative adversarial network (GAN) loss". The training device may train, based on an output of the first discriminator, the first discriminator to distinguish between the first output image and the first rendered image.

As described in more detail below, in an embodiment, a generative model including renderer(s) and/or discriminator (s) may be trained. The training device may train a generative model or a renderer using a trained discriminator or perform an inference operation (e.g., generating an output image) using at least one of the discriminator and the generative model (renderer). A training method and a training structure of a neural network model are described below with reference to the following drawings.

Figure 6:
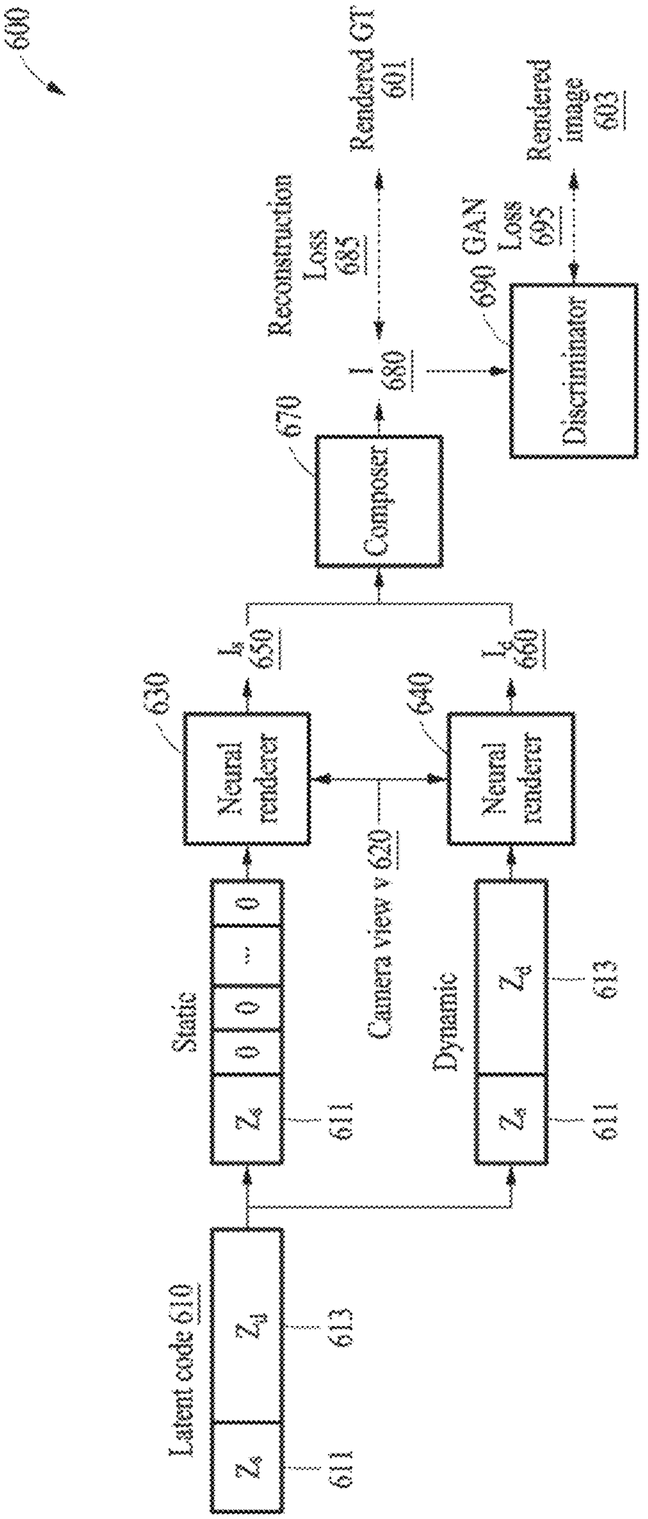
FIG. 6 is a diagram illustrating a training structure of a rendering device, according to an embodiment.

FIG. 6 is a diagram illustrating a training structure of a rendering device, according to an embodiment. FIG. 6 illustrates a diagram 600 showing a process of training a generative model (e.g., a first neural renderer 630 and a second neural renderer 640) and a first discriminator 690, based on a reconstruction loss 685 and a GAN loss 695.

A training device may deconstruct first latent code 610 by separating first static code 611 corresponding to a first static factor and first dynamic code 613 corresponding to a first dynamic factor in a scene representation.

The training device may generate a (1-1)-th rendered image $I_S$ 650 by inputting the first static code 611 and a camera view 620 into a generative model (e.g., the first neural renderer 630).

The training device may generate a (1-2)-th rendered image $I_d$ 660 by inputting the first static code 611, the first dynamic code 613, and the camera view 620 into a generative model (e.g., the second neural renderer 640).

The training device may generate a first output image I 680 by composing the (1-1)-th rendered image $I_S$ 650 and the (1-2)-th rendered image $I_d$ 660 by using a composer 670.

The training device may train a generative model based on the first output image I 680. The training device may train the generative model based on a first difference (e.g., the reconstruction loss 685) between the first output image I 680 and a GT image 601 (rendered GT) corresponding to the first output image I 680. Here, the GT image 601 (rendered GT) may correspond to an image paired with the first output image I 680. In other words, the GT image 601 may correspond to a rendered GT image that matches pixel-by-pixel with the first output image 1680.

According to an embodiment, the training device may further include the first discriminator 690 that discriminates between the first output image I 680 and a first rendered image 603 that is stored in advance. The first discriminator 690 may output a degree to which the output image I 680, which is generated by the training device, and the first rendered image 603, which is stored in a training DB in advance and corresponds to a single scene, are discriminated against each other, for example, in the form of "REAL" (or "1") and "FAKE" (or "0").

The training device may train the generative model based on a second difference (e.g., the GAN loss 695) between the first output image I 680 and the first rendered image 603, wherein the second difference is discriminated by the first discriminator 690. The training device may train the first discriminator 690 to distinguish between the first output image I 680 and the first rendered image 603, based on an output of the first discriminator 690.

The training device may train neural renderers (e.g., 630 and 640) to expand the coverage of the latent code 610 by performing training using both the first difference (e.g., the reconstruction loss 685), which ensures that the neural renderers (e.g., 630 and 640) may accurately render a desired scene under a predetermined condition, and the second difference (e.g., the GAN loss 695) by the first discriminator 690. When only the reconstruction loss 685 is used, training for pairwise reconstruction may exclusively focus on a portion of latent code present in the GT image 601 (rendered GT). However, when the GAN loss 695 is additionally used, the generative model is trained to learn a probability distribution. Therefore, even for latent code lacking an exact matching pair with the GT image (rendered GT) 601, a reasonably suitable image may be estimated based on probability. This may broaden the coverage of the latent code 610.

Figure 7:
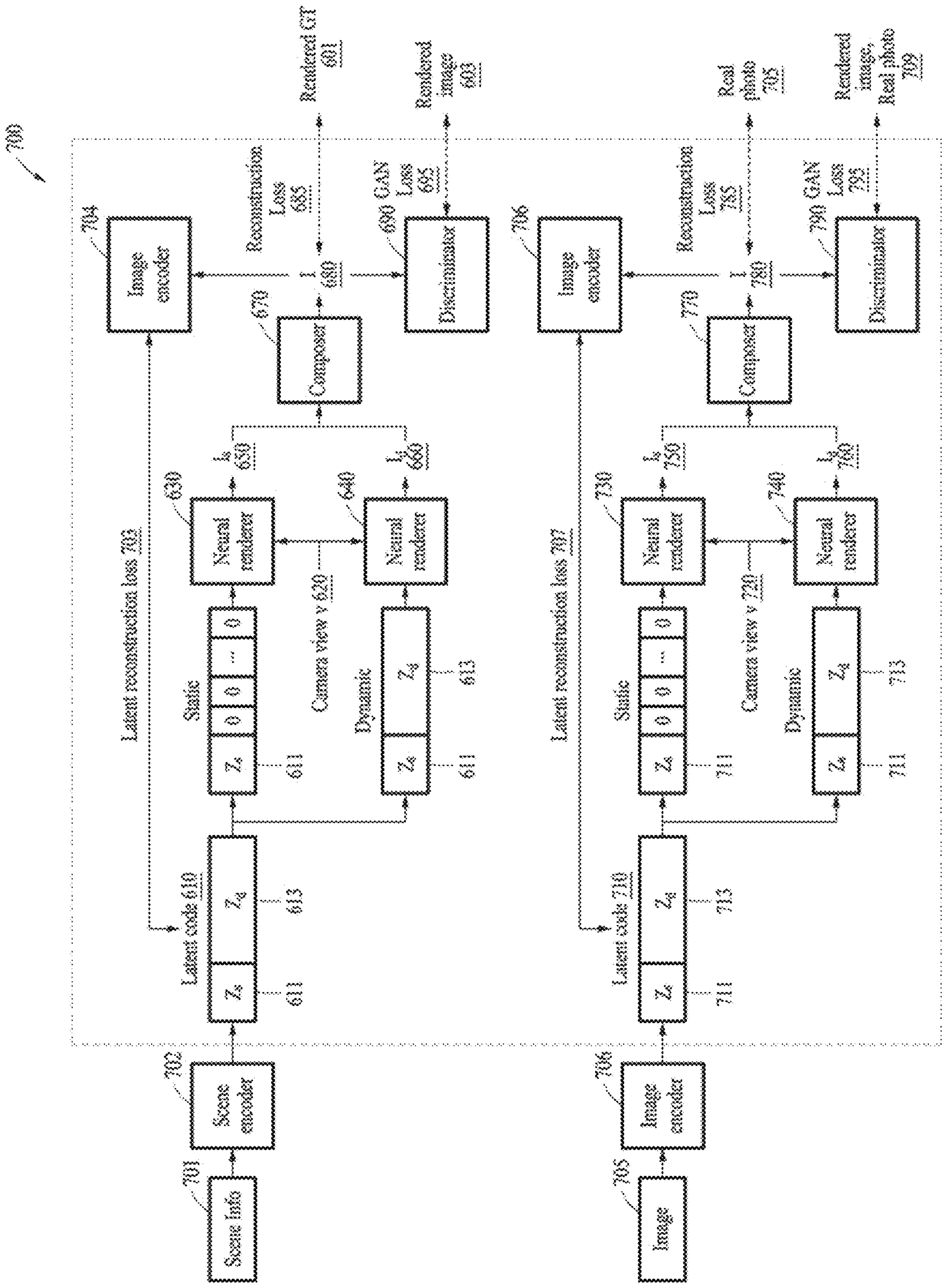
FIG. 7 is a diagram illustrating a training structure of a rendering device, according to an embodiment.

FIG. 7 is a diagram illustrating a training structure of a rendering device, according to an embodiment. FIG. 7 illustrates a diagram 700 showing a process of training a generative model additionally using a photographic image 705 without a label, according to an embodiment.

The photographic image 705 may correspond to an image that does not have a pair of an input image and a GT image, that is, a general photographic image that does not include a label.

When training a neural network model including a generative model using the photographic image 705 without a label, a training device may share the structure of an underlying constructive generative model and respectively define encoders (e.g., a scene encoder 702, an image encoder 704, and an image encoder 706) for inputs. Here, the image encoder 704 may encode information in the form of an image through a neural renderer and composers 670 and 770, based on encoded scene information. The encoded result may no longer include the scene information. Accordingly, the training device may estimate the latent code 610 in reverse by applying the image encoder 704 to the rendered image 680.

In addition, the training device may add a latent reconstruction loss 703, 707 such that a latent space is readily shared and may then train an encoder (e.g., the scene encoder 702, the image encoder 704, and the image encoder 706). The training device may additionally use a regularization loss for stable training.

The training device may receive scene information 701.

The training device may deconstruct the first latent code 610 by separating the static code 611 and the dynamic code 613 by separately encoding a static factor and a dynamic factor included in the scene information 701 using the scene encoder 702.

The training device may generate the (1-1)-th rendered image $I_S$ 650 by inputting the first static code 611 and the camera view 620 into a generative model (e.g., the (1-1)-th neural renderer 630).

The training device may generate the (1-2)-th rendered image $I_d$ 660 by inputting the first static code 611, the first dynamic code 613, and the camera view 620 into a generative model (e.g., the (1-2)-th neural renderer 640).

The training device may generate the first output image I 680 by composing the (1-1)-th rendered image $I_S$ 650 and the (1-2)-th rendered image $I_d$ 660 by using the composer 670. The training device may train the generative model based on a first difference (e.g., the reconstruction loss 685) between the first output image I 680 and the GT image 601 (rendered GT) corresponding to the first output image I 680.

In addition, the training device may train the generative models (e.g., the first neural renderer 630 and the second neural renderer 640) based on a second difference (e.g., the GAN loss 695) between the first output image 680 and the first rendered image 603, wherein the second difference is discriminated by the first discriminator 690. The training device may train the first discriminator 690 to distinguish between the first output image I 680 and the first rendered image 603, based on an output of the first discriminator 690.

The training device may train the scene encoder 702 based on a fifth difference (e.g., the latent reconstruction loss 703) between the first latent code 610 and third latent code generated by inputting the first output image 680 into the scene encoder 702.

In addition, the training device may receive a photographic image 705 without a label. The training device may construct second latent code 710 from the photographic image 705 using the image encoder 706, wherein the second latent code 710 includes second static code 711 corresponding to a second static factor and second dynamic code 713 corresponding to a second dynamic factor.

The training device may generate a (2-1)-th rendered image $I_S$ 750 by inputting the second static code 711 and a camera view 720 into a (2-1)-th neural renderer 730. The camera view 720 may be the same as or different from the camera view 620.

The training device may generate a (2-2)-th rendered image $I_d$ 760 by inputting the second static code 711, the second dynamic code 713, and the camera view 720 into a (2-2)-th neural renderer 740.

The training device may generate a second output image I 780 by composing the first (2-1)-th rendered image $I_S$ 750 and the (2-2)-th rendered image $I_d$ 760 by using the composer 770.

The training device may train generative models (e.g., the (2-1)-th renderer 730 and the (2-2)-th renderer 740) based on a third difference (e.g., the reconstruction loss 785) between the second output image I 780 and the photographic image 705.

The training device may further include a second discriminator 790 that discriminates between the second output image I 750 and a second rendered image 709 that is prestored. The training device may train the generative models (e.g., the (2-1)-th renderer 730 and the (2-2)-th renderer 740) based on a fourth difference (e.g., a GAN loss 795) between the second output image I 750 and the second rendered image 709, wherein the fourth difference is discriminated by the second discriminator 790.

The training device may train the image encoder 706 based on a fifth difference 707 between the first latent code 610 and third latent code generated by inputting the second output image 780 into the image encoder 706.

Figure 8:
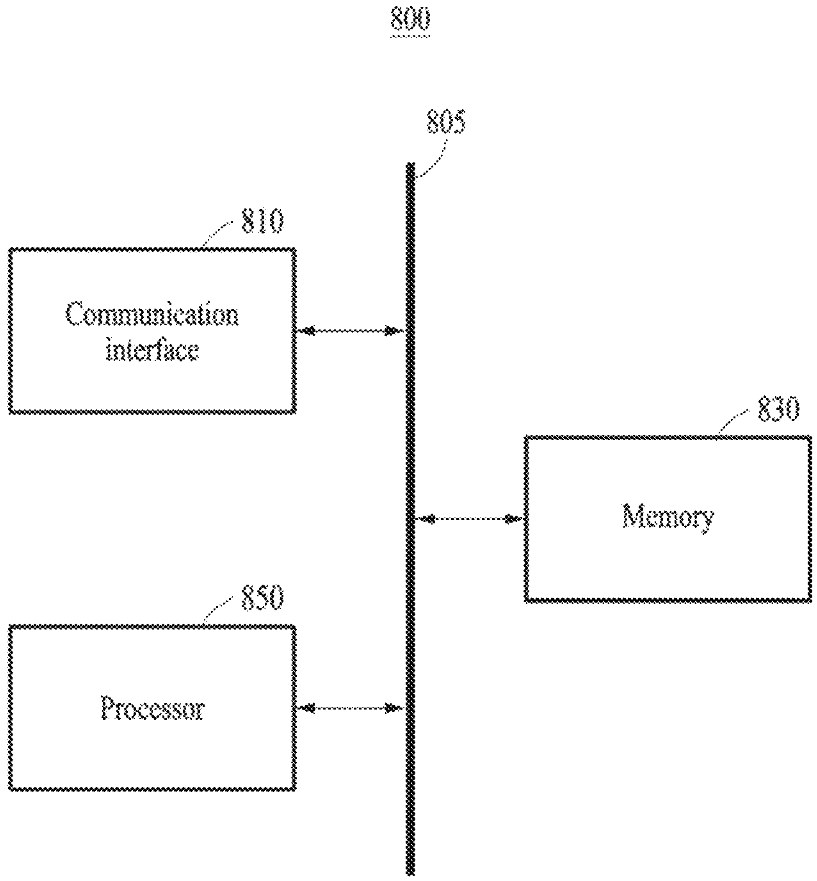
FIG. 8 is a block diagram illustrating a rendering device according to an embodiment.

FIG. 8 is a block diagram illustrating a rendering device according to an embodiment. Referring to FIG. 8, a rendering device 800 may include a communication interface 810, a memory 830, and a processor 850. The communication interface 810, the memory 830, and the processor 850 may be connected to one another via a communication bus 805.

The communication interface 810 may receive a scene representation and a camera view.

The memory 830 may store a generative model based on a pretrained artificial neural network. The generative model may be a model based on an artificial neural network pretrained to perform, for example, a matrix multiplication operation, a convolution operation, an artificial intelligence (AI) operation, and/or high performance computing (HPC) processing. However, embodiments are not limited thereto.

In addition, the memory 830 may store various pieces of information generated during the processing process of the processor 850 described above. In addition, the memory 830 may store a variety of data and programs. The memory 830 may include a volatile memory or a non-volatile memory. The memory 830 may include a large-capacity storage medium such as a hard disk to store the variety of data.

The processor 850 may deconstruct latent code by separating static code corresponding to a static factor and dynamic code corresponding to a dynamic factor in a scene representation. The processor 850 may generate a first rendered image by inputting the static code and a camera view into a generative model. The processor 850 may generate a second rendered image by inputting the dynamic code, the static code, and the camera view into the generative model. The processor 850 may generate a first output image by composing the first rendered image and the second rendered image.

In addition, the processor 850 may perform the methods described with reference to FIGS. 1 to 7 and an algorithm corresponding to the methods.

The processor 850 may execute a program and may control the rendering device 800. Program code to be executed by the processor 850 may be stored in the memory 830. The processor 850 may be, for example, a mobile application processor (AP) but is not necessarily limited thereto. The processor 850 may be a hardware-implemented electronic device having a physically structured circuit to execute desired operations. The desired operations may include, for example, code or instructions in a program. A hardware-implemented rendering device (e.g., 800) may include, for example, a microprocessor, a central processing unit (CPU), a graphics processing unit (GPU), a processor core, a multi-core processor, a multiprocessor, an application-specific integrated circuit (ASIC), a field-programmable gate array (FPGA), and a neural processing unit (NPU).

The embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, an FPGA, a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular;

however, one of ordinary skill in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, one of ordinary skill in the art may apply various technical modifications and variations based thereon. For example, suitable results may be achieved if the described techniques are performed in a different order, and/or if components in a described system, architecture, device, or circuit are combined in a different manner, and/or replaced or supplemented by other components or their equivalents. Therefore, other implementations, other embodiments, and equivalents to the claims are also within the scope of the following claims.

What is claimed is:

1. A rendering method comprising:

receiving a scene representation and a camera view;

deconstructing latent code by separating static code corresponding to a static factor of the scene representation and dynamic code corresponding to a dynamic factor of the scene representation;

generating a first rendered image by inputting the static code and the camera view into a generative model based on an artificial neural network;

generating a second rendered image by inputting the static code, the dynamic code, and the camera view into the generative model; and generating an output image by composing the first rendered image and the second rendered image.

2. The rendering method of claim 1, wherein the deconstructing the latent code comprises:

receiving scene information comprising the static factor and the dynamic factor; and separating the static code and the dynamic code by separately encoding the static factor and the dynamic factor.

3. The rendering method of claim 2, wherein the scene information comprises at least one of three-dimensional (3D) geometric information comprising a position, a normal, and a depth map, material information comprising a light reflection direction, and lighting information comprising an environment map.

4. The rendering method of claim 2, wherein the generating the first rendered image comprises generating, based on the static code and static scene information extracted from the scene information, the first rendered image in the camera view by a first neural renderer.

5. The rendering method of claim 1, wherein the generative model comprises a first neural renderer, and wherein the generating the first rendered image comprises generating, based on the static code, the first rendered image in the camera view using the first neural renderer.

6. The rendering method of claim 1, wherein the generative model comprises a second neural renderer, and wherein the generating the second rendered image comprises generating, based on the static code and the dynamic code, the second rendered image in the camera view by the second neural renderer.

7. The rendering method of claim 6, wherein the generating the second rendered image comprises generating, based on the static code, the dynamic code, and dynamic scene information extracted from scene information, the second rendered image in the camera view by the second neural renderer.

8. The rendering method of claim 1, wherein the generative model comprises at least one of a first neural renderer configured to generate the first rendered image and a second neural renderer configured to generate the second rendered image, and wherein the first neural renderer and the second neural renderer are a same generative model with a same input form or are different generative models with different input forms.

9. The rendering method of claim 1, wherein the generating the output image comprises:

generating a composite image by composing the first rendered image and the second rendered image; and generating the output image based on the composite image.

10. The rendering method of claim 1, wherein, based on the scene representation corresponding to a static scene, a value of the static code at a position in the static code is the same as a value of the dynamic code at a position in the dynamic code corresponding to the position in the static code.

11. The rendering method of claim 1, further comprising:

receiving scene information corresponding to the camera view, wherein the scene information comprises at least one of a geometry (G)-buffer and a rasterized image.

12. The rendering method of claim 11, wherein the generating the first rendered image comprises generating, by the generative model, the first rendered image in the camera view based on information corresponding to a static factor of the scene information corresponding to the static code and the camera view.

13. The rendering method of claim 11, wherein the generating the second rendered image comprises generating, by the generative model, the second rendered image in the camera view based on information corresponding to a dynamic factor of the scene information corresponding to the static code, the dynamic code, and the camera view.

14. A training method for rendering, the training method comprising:

deconstructing first latent code by separating first static code corresponding to a first static factor and first dynamic code corresponding to a first dynamic factor;

generating a (1-1)-th rendered image by inputting the first static code and a camera view into a generative model;

generating a (1-2)-th rendered image by inputting the first static code, the first dynamic code, and the camera view into the generative model;

generating a first output image by composing the (1-1)-th rendered image and the (1-2)-th rendered image; and training the generative model based on the first output image.

15. The training method of claim 14, wherein the training the generative model comprises training the generative model based on a first difference between the first output image and a ground truth image corresponding to the first output image.

16. The training method of claim 14, wherein the training the generative model comprises training the generative model based on a second difference between the first output image and a prestored first rendered image, wherein the second difference is discriminated by a first discriminator configured to discriminate between the first output image and the prestored first rendered image.

17. The training method of claim 16, further comprising:

training the first discriminator to distinguish between the first output image and the prestored first rendered image based on an output of the first discriminator.

18. The training method of claim 16, further comprising:

receiving a photographic image without a label;

deconstructing, by an image encoder, second latent code comprising second static code corresponding to a second static factor of the photographic image and second dynamic code corresponding to a second dynamic factor of the photographic image;

generating a (2-1)-th rendered image by inputting the second static code and the camera view into the generative model;

generating a (2-2)-th rendered image by inputting the second dynamic code, the second static code, and the camera view into the generative model;

generating a second output image by composing the (2-1)-th rendered image and the (2-2)-th rendered image; and training the generative model based on a third difference between the second output image and the photographic image.

19. The training method of claim 18, wherein the training of the generative model comprises training the generative model based on a fourth difference between the second output image and a prestored second rendered image, wherein the fourth difference is discriminated by a second discriminator configured to discriminate between the second output image and the prestored second rendered image.

20. The training method of claim 18, wherein the training of the generative model further comprises training the image encoder based on a fifth difference between third latent code and the first latent code, wherein the third latent code is generated by inputting the second output image into the image encoder.

21. A rendering device comprising:

a communication interface configured to receive a scene representation and a camera view;

at least one memory storing one or more instructions and a generative model based on a pretrained artificial neural network; and at least one processor in communication with the communication interface and the at least one memory, wherein the at least one processor is configured to execute the one or more instructions, and wherein the one or more instructions, when executed by the at least one processor, cause the rendering device to:

deconstruct latent code by separating static code corresponding to a static factor of the scene representation and dynamic code corresponding to a dynamic factor of the scene representation, generate a first rendered image by inputting the static code and the camera view into the generative model, generate a second rendered image by inputting the dynamic code, the static code, and the camera view into the generative model, and generate a first output image by composing the first rendered image and the second rendered image.

* * * * *